INVENTOR.
Allan G. Lloyd
BY
John A. Harvey
Attorney

June 22, 1965 A. G. LLOYD 3,191,115
DIRECT-CURRENT TO ALTERNATING-CURRENT INVERTER
Filed Nov. 22, 1960 2 Sheets-Sheet 2
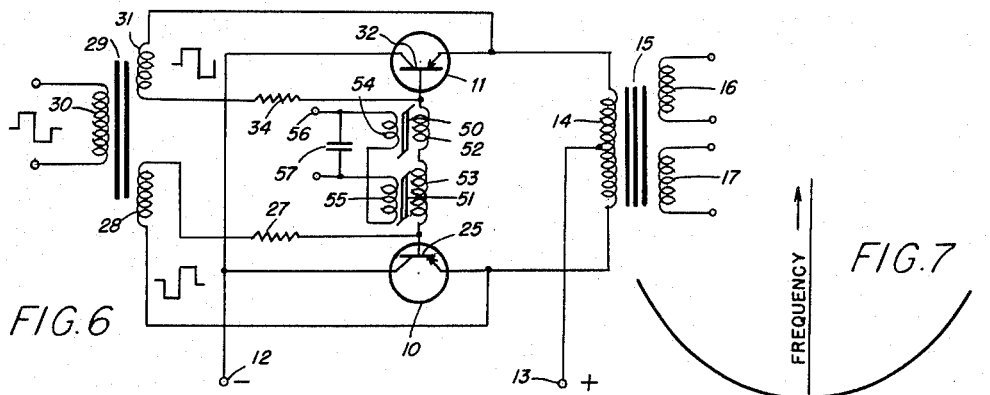
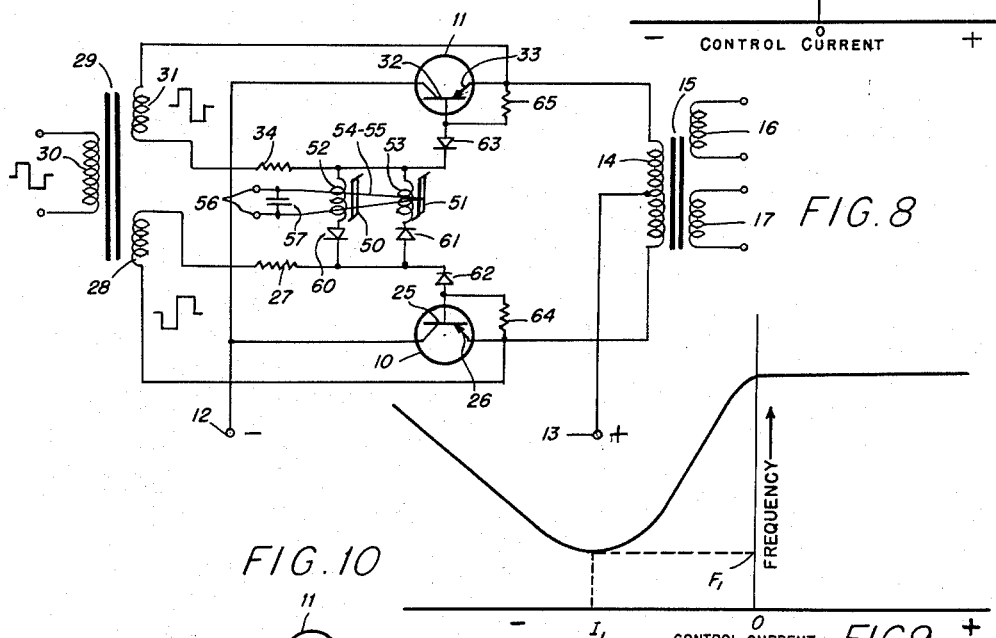
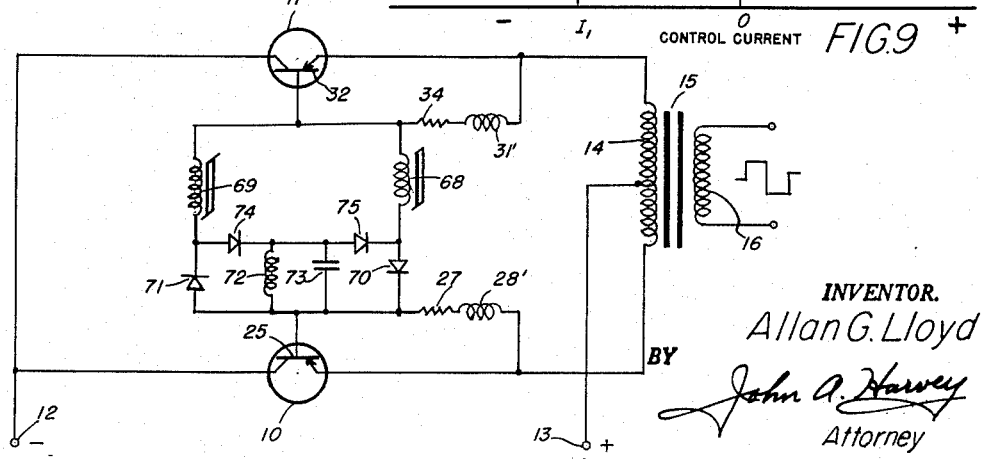
INVENTOR.
*Allan G. Lloyd*
BY
*John A. Harvey*
Attorney

United States Patent Office 3,191,115
Patented June 22, 1965

3,191,115
DIRECT-CURRENT TO ALTERNATING-CURRENT INVERTER
Allan G. Lloyd, Hanover, N.J., assignor, by mesne assignments, to General Mills, Inc., Minneapolis, Minn., a corporation of Delaware
Filed Nov. 22, 1960, Ser. No. 70,982
12 Claims. (Cl. 321—45)

The present invention relates to direct-current to alternating-current inverters and, particularly, to inverters of the type having no moving parts. The present invention has particular utility in inverters of the transistorized form using transistors as the principal power translation devices, and will be described in that connection.

The transistorized form of direct-current to alternating-current inverter utilizes an output transformer having a secondary winding in which the alternating current is generated by alternating the polarity of unidirectional energization of a primary winding from a unidirectional power source. This alternate polarity energization of the primary winding is accomplished by use of two power translation transistors which couple the unidirectional source to the transformer primary winding and are alternately rendered conductive by control currents of rectangular waveform supplied between the base and emitter electrodes of each transistor. These control currents have opposite relative phase as supplied to the transistors, and are generated either in a source independent of the inverter or as feedback currents derived from the output transformer of the inverter. Where an independent source of control current is provided, the output transformer of the inverter is operated in its non-saturated state, and the periodicity of the inverter operation is principally dependent upon the periodicity of the input control currents. These are of sufficient amplitude to cause the transistors to operate in their saturation state, and by reason of this the amplitude of the generated output alternating current varies with the magnitude of the unidirectional energizing power supplied to the inverter. Where the control currents are derived from the output transformer of the inverter, the inverter becomes self-oscillatory and its frequency of operation and the amplitude of generated output alternating current both vary with the magnitude of the unidirectional power which energizes the inverter.

The self-oscillatory type of inverter has received widespread application, but heretofore has exhibited several undesirable operating characteristics. The feedback currents in these arrangements are derived either from an output transformer having a saturable core and normally operated to saturation flux density or are supplied from a non-saturating output transformer through a saturable transformer used principally to insure that the feedback voltages have rectangular waveform and to establish the nominal periodicity of these voltages. Theoretically the pulses of the feedback voltage, whether derived from a saturable output transformer or from a saturable feedback transformer, should have perfectly rectangular waveform with infinitely steep leading and lagging edges. In practice, however, such feedback voltage waveform has not been readily attainable and both the leading and lagging edges of the voltage pulses have exhibited a finite slope particularly where the inverter is operated at a frequency of the order of 1500 cycles. This may be explained by the fact that the remnant flux of a saturable core is very nearly equal to the saturating value of flux so that the saturable core is characterized by relatively small values of magnetic energy return. This fact, considered in the light of the relatively few numbers of turns used in saturable transformers, give rise to the finite slopes of the feedback voltage pulse waveform and resultant delay of control current change between its minimum and maximum amplitude values. Any such delay increases the transistor dissipation since the transistor has a large voltage appearing across its emitter and collector terminals and is conducting appreciable values of current through the delay interval. Such dissipation, of course, reduces the inverter efficiency and is often increased substantially by transients superimposed upon the finite slope of the feedback voltage pulses by reason of the leakage inductance of the saturable transformer. Transient waveform disturbances of this character are also undesirable for other reasons in many applications, as when the alternating output current is supplied to a rectifier and filter system to derive a unidirectional voltage of amplitude different from that of the input unidirectional energizing voltage.

The self-oscillatory form of inverter heretofore considered is usually characterized both by relatively unstable frequency characteristics and relatively unstable output amplitude characteristics with variation of various operating permeatures such as variations of the input unidirectional energizing voltage. Additionally, these prior arrangements often cause the creation of short duration transients or "spikes" in the unidirectionally power energizing input circuit, and these transients may often impair the operation of nearby equipments particularly when used for radio communications or in providing radar displays.

It is an object of the present invention to provide a new and improved direct-current to alternating-current inverter which avoids one or more of the disadvantages and limitations of prior inverters of the type described.

It is a further object of the invention to provide a direct-current to alternating-current inverter having substantially improved stability of the amplitude or frequency of the output alternating current generated by the inverter notwithstanding appreciable variations of amplitude of the unidirectional energizing voltage supplied to the inverter.

It is an additional object of the invention to provide a direct-current to alternating-current inverter which exhibits high operating efficiency and stable, although readily adjustable, frequency or output amplitude and one in which stability of one or more desired operational characteristics is attained by use of passive circuit components without the need of any active stabilizing components.

It is yet a further object of the invention to provide a direct-current to alternating-current inverter which generates output alternating voltages of rectangular waveform substantially free of undesired transient disturbances and having very steep leading and lagging waveform portions yet does not create any appreciable transient disturbances in the input unidirectional excitation power circuit.

It is a further object of the invention to provide an improved direct-current to alternating-current inverter characterized by high sensitivity to selective adjustment of its operating frequency over an appreciable frequency range yet one which also exhibits high frequency stability at any selected frequency of operation.

Other objects and advantages of the invention will appear as the detailed description thereof proceeds in the light of the drawings forming a part of this application and in which:

FIGS. 3–6 are circuit diagrams of inverters using additionally modified forms of the invention;

FIG. 7 graphically represents the frequency versus control current operating characteristic of a self-oscillatory inverter of the FIG. 6 type;

FIG. 8 is a circuit diagram representing yet another form of the invention, FIG. 9 graphically representing the frequency versus control current operating characteristic of a self-oscillatory arrangement of the FIG. 8 type; and FIG. 10 is a circuit diagram of an inverter utilizing a further modified form of the invention.

Figure 1:
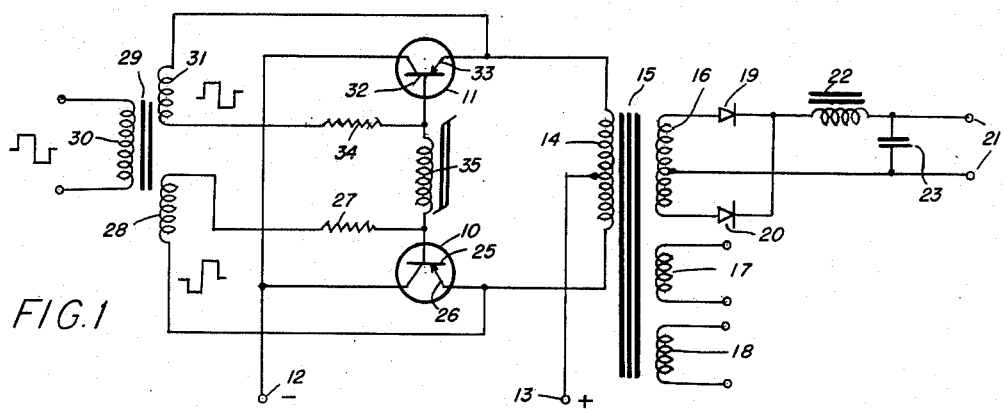
FIG. 1 is a circuit diagram of a direct-current to alternating-current inverter utilizing the present invention in a particular form, and FIG. 2 graphically represents certain operating characteristics of the FIG. 1 inverter and is used as an aid in explaining its operation.

Referring now more particularly to the direct-current to alternating-current inverter having the circuit arrangement shown in FIG. 1, a pair of transistors 10, 11 of the PNP type have their emitter and collector electrodes connected between a source of unidirectional power represented by terminals 12 and 13 and the primary winding 14 of an output transformer 15 having multiple secondary windings 16, 17 and 18. The transistors 10 and 11 are so controlled, in a manner presently to be described, as alternately to energize the primary winding 14 of the transformer 15 from the unidirectional source 12, 13 but with a direction of energization by the transistor 10 opposite to that provided by the transistor 11. The alternating potential thus produced in the secondary windings 16, 17 and 18 may be supplied to energize load devices, such as the rectifier system comprised by the diode rectifiers 19 and 20 coupled to the transformer winding 16 and supplying unidirectional power to an output circuit 21 through a filter comprised by a series choke coil 22 and a shunt condenser 23.

The transistor 10 has a base electrode 25 and an emitter electrode 26 which are energized through a current limiting resistor 27 by a control voltage of rectangular waveform developed in a secondary winding 28 of an input transformer 29 energized from a source of constant-periodicity current of rectangular waveform connected to a primary winding 30 of the input transformer. The latter includes another secondary winding 31 which likewise supplies a control voltage of rectangular waveform to a base electrode 32 and an emitter electrode 33 of the transistor 11 through a current limiting resistor 34. The phase of the current developed in the secondary winding 31 is opposite to that developed in the secondary winding 28 so that the transistors 10 and 11 are rendered alternately conductive by the control currents supplied to their base and emitter electrodes. A saturable reactor 35 is connected directly between the base electrode 25 of the transistor 10 and the base electrode 32 of the transistor 11. The purpose of the reactor 35 is to regulate and mainain substantially constant, with variation of amplitude of the unidirectional energizing voltage supplied to the input terminals 12 and 13, the average voltage developed in the output transformer secondary windings 16, 17 and 18 and supplied to energize load devices connected thereto. In accomplishing this result, only the saturable reactor 35 is operated in its saturation state, the output transformer 15 and input transformer 29 being operated in non-saturated states.

Figure 2:
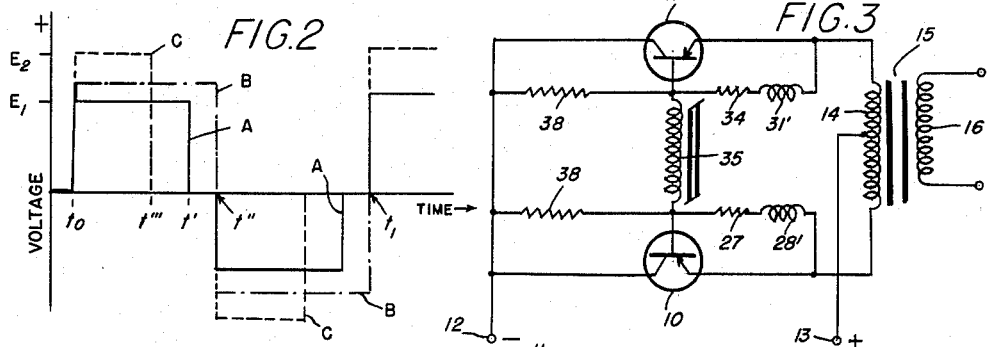

The manner in which the saturable reactor 35 regulates the generated output alternating voltage as last mentioned will now be considered with reference to FIG. 2. It was earlier mentioned that the input voltage to the transformer 29 has constant periodicity. The period of this input voltage is represented in FIG. 2 by the time interval $t_0$–$t_1$. The voltages developed in both of the input transformer secondary windings 28 and 31 are applied in series through the primary winding 14 of the output transformer 15 and the resistors 27 and 34 across the terminals of the saturable inductor 35. It is well known that the product of the voltage applied to a given saturable reactor and the time interval of its application is a constant. That is, the saturable reactor is said to have a constant volt-second characteristic so that the time required for the reactor to change from one polarity of its magnetic saturation to the opposite polarity of magnetic saturation varies inversely with the magnitude of the voltage which produces this change of magnetic saturation. In FIG. 2 the solid line curve A, represents an operating condition wherein a time interval $t_0$–$t'$ is required for the saturable reactor 35 to change its polarity of magnetic saturation when a voltage $E_1$ is applied to the reactor. During this interval $t_0$–$t'$ the reactor 35 presents maximum terminal impedance to the voltage $E_1$, but upon completing its reversal of polarity of magnetic saturation the terminal impedance of the reactor 35 rapidly drops to a very low value.

The voltage developed in the secondary winding 28 or 31 of the input transformer 29 is represented in FIG. 2 by the dot-and-dash line curve B, and a half cycle of this voltage occurs at $t''$. For the operating conditions represented by curve A in FIG. 2, completion of the reversal of polarity of magnetic saturation of the reactor 35 is completed at time $t'$ prior to the time $t''$ corresponding to the first half cycle of the input voltage. The input voltage, were it not for the reactor 35, would cause one of the transistors 10 or 11 to be rendered conductive and non-conductive alternately during successive complete half cycles of the input voltage. This control action is modified, however, when the saturable reactor 35 completes a reversal of polarity of its saturation state its terminal impedance rapidly decreases as at time $t'$. Such reduction of terminal impedance of the reactor 35 causes the relative voltage between the base electrode and emitter electrode of the conductive one of the transistors to be reduced to a relatively low value and thereby reduce substantially the conductivity of this transistor. This reduced conductivity terminates the effective energization of the primary winding 14 of the output transformer 15 from the unidirectional energizing source 12, 13, and as noted above this may occur at a time $t'$ prior to the end of the first half cycle of the input voltage of the transformer 29. It will be evident that the same character of operation occurs during the second half cycle of the input voltage as graphically shown in FIG. 2.

Assume now that the unidirectional energizing voltage applied to the terminals 12 and 13 increases in amplitude. This increase causes a larger voltage excitation to be applied through the transistors 10 and 11 to the primary winding 14 of the output transformer 15. It can readily be shown that such increased excitation of the primary winding 14 increases the voltage applied across the terminals of the saturable reactor 35. Assume that this increased terminal voltage now has the value $E_2$. The saturable reactor 35, due to its constant volt-second characteristic earlier mentioned now completes the reversal of the polarity of its magnetic saturation during a shorter time interval. This constant volt-second characteristic of the reactor 35 is represented by the broken line curve C, and it will be seen that the reactor 35 now requires a shorter interval $t_0$–$t'''$ to effect reversal of polarity of its magnetic saturation. This new interval is appreciably shorter than the half cycle of the input voltage, with the result that the increased excitation of the primary winding 14 of the output transformer 15 occurs for a shorter interval during each half cycle of the input voltage due to the control exerted by the saturable reactor 35 over the interval of conductivity of the transistors 10 and 11 in the manner previously explained. Thus the increased voltage excitation, together with the reduced excitation interval of the output transformer primary winding 14, causes the voltage developed in the output transformer secondary windings 16, 17 and 18 to maintain a substantially constant average value. It will accordingly be apparent that the saturable reactor 35 comprises a passive circuit component which so controls or regulates the operation of the inverter as to maintain substantially constant the average amplitude of the alternating voltage developed by the inverter.

Figure 3:
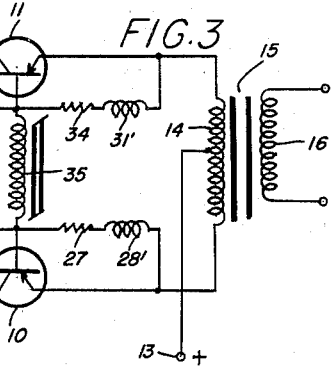

FIG. 3 is a circuit diagram of an inverter of the self-oscillatory type embodying the present invention. The arrangement of FIG. 3 is in many respects essentially similar to that of FIG. 1 just described so that circuit components of FIG. 3 which correspond to the same components of the FIG. 1 arrangement are identified by the same reference numerals and analogous components are identified by the same reference numerals primed. In the present inverter the transformer windings 28' and 31', which supply control voltages of rectangular waveform to the base and emitter electrodes of the power translation transistors 10 and 11, are magnetically coupled to the primary winding 14 of the output transformer 15 or may be comprised by extended terminal portions of the primary winding. Conventional starting resistors 38 are connected between the negative terminal 12 of the unidirectional input energizing circuit and the base electrode of each transistor to facilitate the initial starting of the inverter as an oscillatory system.

In the present arrangement, the saturable reactor 35 functions to terminate each half cycle of oscillation of the inverter so that each such half cycle is controlled by the constant value of the volt-second characteristic of the reactor 35. By reason of this, both the frequency or periodicity and amplitude of the alternating potential of rectangular waveform developed in the secondary winding 16 of the output transformer 15 vary with the amplitude of the unidirectional energizing voltage supplied to the input terminals 12 and 13. The present arrangement, however, possesses the important advantage that the output transformer 15 is operated in a non-saturating mode, so that the large magnetizing current spikes in the transformer 15 normally associated with this mode of operation do not occur. Transient disturbances, particularly in the nature of voltage waveform "spikes" of the output voltage waveform and caused in large part by the magnetizing current spikes discharging through the leakage inductance of the output transformer 15, are greatly reduced or even eliminated. The present arrangement also substantially enhances the rapidity with which the transistors 10 and 11 change between their conductive and non-conductive states, thus substantially improving the efficiency of operation of the inverter. Conventional self-oscillatory inverters heretofore used often cause transient current and voltage "spikes" in their unidirectional input energizing circuit; these are substantially reduced or even eliminated by a self-oscillatory inverter of the FIG. 3 type and embodying the present invention.

Figure 4:
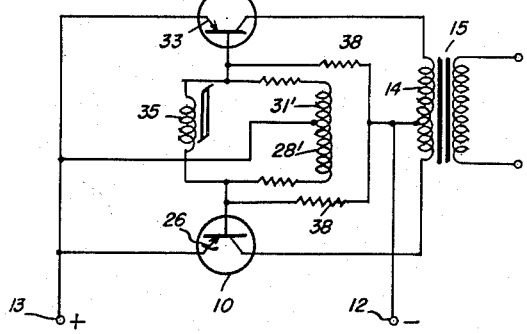

Whereas inverters having the circuit arrangement shown in FIGS. 1 and 3 have the collector electrodes of the power translation transistors 10 and 11 connected in common to the negative terminal 12 of the unidirectional energizing input circuit, the present invention has equal utility in inverters which utilize a common connection between the emitter electrodes of their power translation transistors and the positive terminal of the unidirectional input energizing circuit. An inverter of the latter type, and embodying the present invention, is shown in FIG. 4 which is essentially similar to the arrangement of FIG. 3 and similar circuit components are identified by similar reference numerals. In the present arrangement the control current feedback windings 28' and 31' are magnetically coupled to the primary winding 14 of the output transformer 15 as in the FIG. 3 arrangement, and the common junction between the windings 28' and 31' is connected to both of the emitter electrodes 26 and 33 of the respective transistors 10 and 11. The latter electrodes are connected to the positive terminal 13 of the input unidirectional energization, which in the present arrangement has its negative terminal 12 connected to the center tap of the output transformer primary winding 14. The operation of the FIG. 4 arrangement and its operating characteristics are the same as those of the FIG. 3 inverter.

Figure 5:
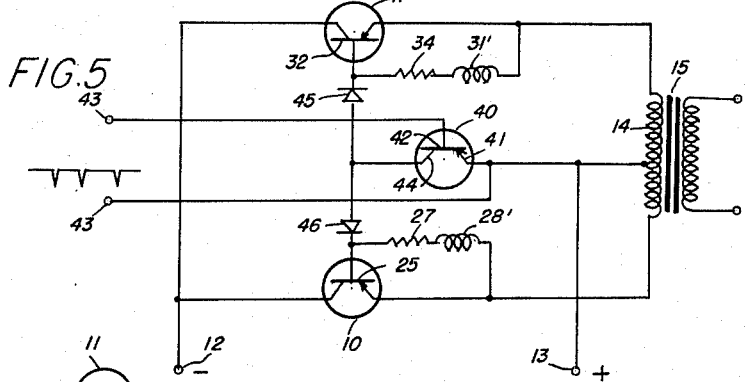

In all of the inverters heretofore described, the change between the conductive and non-conductive states of the power translation transistors is controlled by a saturable reactor which is electrically isolated from the output transformer of the inverter and may be constructed of relatively small physical size and needing only relatively small saturation energization with consequent improvement of the inverter efficiency. However, the operational control provided by the saturable reactor and certain of the advantages accruing from its use may also be effected and attained by a control component of different form. FIG. 5 is a circuit diagram of an inverter similar to that of FIG. 3, similar components being identified by similar reference numerals, except that a control transistor 40 has its emitter electrode 41 and base electrode 42 connected to a source of negative potential pulses connected to the input terminals 43, 43 of a control circuit of the inverter. The emitter electrode 41 is also connected to the positive terminal 13 of the unidirectional input energizing circuit, and its collector electrode 44 is connected to the junction of a pair of diode rectifiers 45 and 46 connected with reversed polarities between the base electrodes 25 and 32 of the respective transistors 10 and 11.

The pulse potential applied to the input terminals 43 of the FIG. 5 inverter has a constant periodicity which controls the oscillatory period of the inverter. The manner in which this is accomplished will be evident when it is considered that each input potential pulse applied to the terminals 43 causes the control transistor 40 to be rendered conductive, and its conductive state thereupon impresses the positive potential of the unidirectional energizing source through one of the rectifiers 45 or 46 to the base electrode of the conductive one of the transistors 10 or 11. This positive potential impressed upon the base electrode reduces the base electrode to emitter potential of the conductive transistor and in turn reduces the conductivity of this transistor. Such reduced conductivity of the transistor causes the feedback control voltages developed in the transformer windings 21' and 31' to render the other transistor fully conductive and to cause the one transistor to be rendered entirely non-conductive. Accordingly the input pulse potential of the input terminals 43 controls the alternating conductiviy of the power translation transistors 10 and 11 and this is accomplished without operation of the output transformer 15 in a state of saturation.

The inverter arrangement of FIG. 6 is essentially similar to that of FIG. 1, similar components being identified by similar reference numerals, but with the difference that the saturable reactor 35 of FIG. 1 is replaced in the arrangement of FIG. 6 with what might conveniently be considered a magnetic amplifier structure. This includes a pair of saturable reactors 50 and 51 having respective windings 52 and 53 serially connected between the base electrodes 25 and 32 of the respective power translation transistors 10 and 11. A control winding 54 associated with the winding 52 is serially connected with a winding 55 associated with the winding 53 to a pair of input terminals 56 to which are supplied a unidirectional current of selectable value and having either positive or negative polarity as applied to one of the windings 54 or 55. A condenser 57 connected across the input terminals 56 by-passes the second and higher order even harmonic components of the voltages induced in the windings 54 and 55 during operation of the inverter.

The operation of the FIG. 6 inverter is similar to that described in connection with FIG. 1 except that the volt-second characteristic of the reactors 50 and 51 have values controlled by the magnitude of the unidirectional current supplied to the terminals 56, the volt-second characteristic being constant for any selected value of this control current but having maximum value when the control current has very small or zero value and having decreasing values as the magnitude of the control current becomes increasingly large. It may be noted in this respect that the volt-second characteristic value of the saturable reactors 50 and 51 control the termination of each interval of conductivity of individual ones of the transistors 10 and 11. It may also be noted that the windings 54 and 55 are connected with reversed magnetic polarities as indicated so that a current flows through these windings and the condenser 57 to effect concurrent but opposite changes in the reversal of the magnetic polarity of saturation of the reactors 50 and 51. Thus each reactor is alternately "set" to saturation in one magnetic polarity and "reset" to its opposite polarity of magnetic saturation during successive half cycles of operation of the inverter. In the light of the previously described operation of the FIG. 1 inverter arrangement, it will be apparent that the inverter of FIG. 6 likewise regulates and maintains substantially constant the average amplitude of the alternating voltage of rectangular wave-form developed in the output transformer secondary windings 16 and 17 but with the difference that the value of output voltage amplitude may be adjusted by adjustment of the value of control current supplied to the input terminals 56.

The FIG. 6 inverter may be rendered self-oscillatory by changing its circuit configuration to one similar to that of FIG. 3; namely, by dispensing with the input transformer 29 and by utilizing windings 28′ and 31′ coupled to the primary winding 14 of the output transformer 15 and including starting resistors 38 to facilitate initiation of the self-oscillatory state of the inverter. An inverter of this self-oscillatory type is characterized by an operation graphically indicated in FIG. 7 wherein the frequency of self-oscillation varies with the magnitude of the control current supplied to the input terminals 56. This enables the self-oscillatory frequency to be varied over a relatively wide range by selection of the value of the control current, the lowest operating frequency occurring with a minimum value of control current and higher self-oscillatory frequencies being obtained with increasingly larger values of the control current of either polarity.

Whereas the inverter of FIG. 6 utilizes serially arranged magnetic amplifier transformers, such transformers may likewise be operated in parallel relationship as shown by the inverter arrangement of FIG. 8. The latter is essentially similar to the FIG. 6 inverter, and similar components are designated by similar reference numerals. In the inverter of FIG. 8, a diode rectifier device 60 is included in series with the winding 52 of the transformer 50 and a diode rectifier 61 is included in series with the winding 53 of the transformer 51. The diode rectifiers 60 and 61 are connected with opposite directions of conductivity as shown, and the parallel arranged transformers 50 and 51 are included in series with diode rectifiers 62 and 63 between the base electrode 25 of the transistor 10 and the base electrode 32 of the transistor 11. The diode rectifier 62 is connected with such polarity that it is rendered conductive when the voltage induced in the transformer winding 28 causes the emitter 26 of the transistor 10 to be positive with respect to its base electrode 25, and the rectifier 63 is connected with such polarity that it also is rendered conductive when the potential induced in the transformer winding 31 causes the emitter 33 of the transistor 11 to be positive with respect to its base electrode 32. A resistor 64 is connected between the emitter and base electrodes of the transistor 10, and a resistor 65 is connected between the emitter and base electrodes of the transistor 11.

The operation of the inverter of FIG. 8 is essentially similar to that of FIG. 6, the diode rectifiers 62 and 63 serving to prevent the potential drops which appear across the diode rectifiers 60 and 61 during the saturation state of the transformers 50 and 51 from being applied as a bias voltage to the base electrodes 25 and 32 of the respective transistors 10 and 11. The resistors 64 and 65 prevent what would otherwise be an open base circuit character of operation of the transistors 10 and 11 during intervals when their associated diode rectifiers 62 and 63 are nonconductive. The present inverter arrangement is characterized, like that of FIG. 6, by a substantially constant amplitude of the generated alternating current voltage of rectangular waveform developed in the secondary windings 16 and 17 of the output transformer 15.

The inverter arrangement of FIG. 8 may be rendered self-oscillatory as in the manner of the inverter of FIG. 3, and as explained more fully in connection with the arrangement of FIG. 6, in which event the inverter exhibits a self-oscillatory frequency versus control current characteristic graphically shown in FIG. 9. Here the minimum oscillatory frequency of value $F_1$ occurs at a negative value of control current $I_1$ whereas a maximum frequency of self-oscillation occurs for positive values of the control current supplied to the input terminals 56, the sensitivity of frequency control being exceptionally high as indicated by the relatively steep slope of the characteristic over the range of values of the input control current from zero to $I_1$. At the same time, this high sensitivity of frequency control is accomplished by small values of control power supplied to the magnetic amplifier transformers 50 and 51.

A self-oscillatory inverter of the FIG. 8 type may be controlled with respect to its nominal frequency of self-oscillation as last described, but does exhibit increments of change of the self-oscillatory frequency with variation of the unidirectional energizing voltage supplied to the input terminals 12 and 13. A self-oscillatory inverter having exceptionally high stability of its self-oscillatory frequency is shown in FIG. 10. This arrangement utilizes saturable reactors 68 and 69 connected in series with individual diode rectifiers 70 and 71 between the base electrode 25 of the transistor 10 and the base electrode 32 of the transistor 11, the diode rectifiers 70 and 71 having opposite polarities of conduction as shown. A parallel resonant circuit comprised by an inductor 72 and shunt connected condenser 73 is coupled by a diode rectifier 74 between the saturable reactor 69 and the base electrode 25 of the transistor 10 and is also coupled by a diode rectifier 75 between the saturable reactor 68 and the base electrode 25 of the transistor 10, the diode rectifiers 74 and 75 having the conductive polarities shown.

When during a self-oscillatory cycle of the FIG. 8 inverter the base electrode 32 has a net positive potential with respect to the base electrode 25, the diode rectifier 70 is rendered conductive and the saturable reactor 68 begins to change its polarity of magnetic saturation. It terminates the half cycle of inverter operation when the change of saturation is completed and it does this in the same manner as described with reference to the FIG. 3 inverter. While this occurs, the diode 74 is also rendered conductive and the saturable reactor 69 likewise changes the polarity of its magnetic saturation. The current flow through the diode rectifier 74 at this time is into the resonant circuit 72, 73. This change of magnetic saturation of the reactor 69 has no significant effect upon the termination of the half cycle of operation of the inverter since the diode rectifier 71 is not conductive at this time.

During the next half cycle of the inverter operation when the base electrode 25 has a net positive potential with respect to the base electrode 32, the diode rectifier 71 is rendered conductive and the saturable reactor 69 changes its polarity of magnetic saturation to terminate the cycle of operation when the change of saturation is completed. While this occurs, the diode rectifier 75 is rendered conductive and current flows from the parallel resonant circuit 72, 73 through the saturable reactor 68 to change the magnetic polarity of saturation of the latter. This change of saturation of the reactor 68 has insignificant effect on the termination of the half cycle of operation since the diode rectifier 70 is non-conductive at this time.

Each period of current flow into and out of the parallel resonant circuit 72, 73 through the diode rectifiers 74 and 75 enhances opposite half cycles of oscillation of the parallel resonant circuit and the oscillatory energy stored in this parallel resonant circuit tends so to control the self-oscillatory frequency of the inverter as to maintain maximum energy storage in the parallel resonant circuit. In this it will be apparent that the voltage developed across the parallel resonant circuit 72, 73 influences the magnitudes of the non-saturated values of current flowing through the saturable reactors 68 and 69. The self-oscillatory frequency of the inverter accordingly is stabilized with very close tolerance to a frequency corresponding to the resonant frequency of the parallel resonant circuit 72, 73 even though the unidirectional energizing voltage supplied to the input terminals 12 and 13 may vary over an appreciable range of values.

It will be apparent from the foregoing description of the invention that an inverter embodying the invention exhibits high operating efficiency and very stable, although readily adjustable, amplitude or frequency operating characteristics which are relatively uninfluenced by changes of the unidirectional excitation of the inverter. An inverter embodying the invention generates output alternating voltages of rectangular waveform substantially free of undesired transient waveform disturbances, and characterized by desirably steep leading and lagging pulse waveform portions, while at the same time being relatively free of the injection of transient disturbances into the input unidirectional excitation power circuit.

While specific forms of invention have been described for purposes of illustration, it is contemplated that numerous changes may be made without departing from the spirit of the invention.

What is claimed is:

1. A direct-current to alternating-current inverter comprising an input circuit for energization with unidirectional power and an output transformer having an energizing winding and providing an alternating-current output circuit, a pair of conductance control devices having conductance terminals providing unidirectional coupling of said winding to said input circuit with a polarity of coupling by one of said devices opposite to that of the other and each having forward-conductance control terminals, energizing sources exhibiting relatively poor regulation characteristics and directly electrically connected to the conductance control terminals of said devices for energization thereof in opposed phase relationships to render said devices alternately conductive, and saturable-core reactive means effectively coupled electrically in shunt relation to said sources to be energized thereby alternately to opposite polarities of magnetic saturation by individual ones of said energizing sources for increasing periodically and alternately the saturation-effect loading of said sources and thereby terminate each period of conductivity of said devices by reduction of the forward conductance energization of said conductance control terminals by said sources.

2. A direct-current to alternating-current inverter comprising an input circuit for energization with unidirectional power and an output transformer having an energizing winding and providing an alternating-current output circuit, a pair of conductance control devices having conductance terminals providing unidirectional coupling of said winding to said input circuit with a polarity of coupling by one of said devices opposite to that of the other and each having forward-conductance control terminals, energizing sources having resistive energizing circuits exhibiting relatively poor regulation characteristics for individually energizing the conductance control terminals of said devices in opposed phase relationships to render said devices alternately conductive, and a saturable-core reactor energized by individual ones of said energizing source circuits to opposite magnetic polarity saturations to increase periodically and alternately the loading of said sources and thereby alter the forward conductance energization of said conductance control terminals, whereby the periods of conductivity of said devices are controlled by the volt-second characteristic of said reactor.

3. A direct-current to alternating-current inverter comprising an input circuit for energization with unidirectional power and an output transformer having an energizing winding and providing an alternating-current output circuit, a pair of conductance control devices having conductance terminals providing unidirectional coupling of said winding to said input circuit with a polarity of coupling by one of said devices opposite to that of the other and each having conductance control terminals, energizing sources having resistive energizing circuits for individually energizing the conductance control terminals of said device in opposed phase relationships to render said devices alternately conductive, and a saturable-core reactor electrically coupling said energizing source circuits in series for energization by both thereof to control the period of conductivity of at least one of said devices according to the constant volt-second characteristic of said reactor.

4. A direct-current to alternating-current inverter comprising an input circuit for energization with unidirectional power and an output transformer having an energizing winding and providing an alternating-current output circuit, a pair of conductance control devices having conductance terminals providing unidirectional coupling of said winding to said input circuit with a polarity of coupling by one of said devices opposite to that of the other and each having conductance control terminals, energizing sources directly electrically coupled individually to the conductance control terminals of said devices for energization thereof in opposed phase relationships to render said devices alternately conductive, and a saturable-core reactor directly electrically coupling corresponding ones of the conductance control terminals of said devices electrically to couple said energizing sources in series for energization of said reactor by both thereof to terminate each period of conductivity of said devices according to the constant volt-second characteristic of said reactor.

5. A direct-current to alternating-current inverter comprising an input circuit for energization with unidirectional power and an output transformer having an energizing winding and providing an alternating-current output circuit, a pair of transistors having emitter and collector electrodes providing unidirectional coupling of said winding to said input circuit with a polarity of coupling by one of said transistors opposite to that of the other and each having a conductance-control base electrode, a pair of energizing sources directly electrically connected between the emitter and base electrodes of individual ones of said transistors for energizations in opposed phase relationships to render said transistors alternately conductive, and a saturable-core reactor electrically connected directly between the base electrodes of said transistors for energization by both of said sources to terminate each alternate period of conductivity of said transistors according to the constant volt-second characteristic of said reactor.

6. A direct-current to alternating-current inverter comprising an input circuit for energization with unidirectional power and an output transformer having an energizing winding and providing an alternating-current output circuit, a pair of transistors having emitter and collector electrodes providing unidirectional coupling of said winding to said input circuit with a polarity of coupling by one of said transistors opposite to that of the other and each having a conductance-control base electrode, a pair of resistive energizing sources directly electrically connected between the emitter and base electrodes of individual ones of said transistors for energizations in opposed phase relationships to render said transistors alternately conductive, saturable-core reactor means electrically connected directly between the base electrodes of said transistors for energization by both of said sources to terminate each alternate period of conductivity of said transistors according to a volt-second characteristic of said reactor means, and means for varying the volt-second characteristic of said reactor means to vary the periodicity of alternate conduction by said transistors.

7. A direct-current to alternating-current inverter comprising an input circuit for energization with unidirectional power and an output transformer having an energizing winding and providing an alternating-current output circuit, a pair of transistors having emitter and collector electrodes providing unidirectional coupling of said winding to said input circuit with a polarity of coupling by one of said transistors opposite to that of the other and each having a conductance-control base electrode, a pair of resistive energizing sources directly electrically connected between the emitter and base electrodes of individual ones of said transistors for energizations in opposed phase relationships to render said transistors alternately conductive, a pair of unidirectional conductive devices, a pair of saturable-core transformers having windings individually electrically connected in series with one of said devices directly between the base electrodes of said transistors for energization to core saturation in individual opposite magnetic polarities by said sources to terminate each alternate period of conductivity of said transistors according to the value of a volt-second characteristic of said transformers, and means for alternately reversing the polarities of core saturation of said transformers and for adjusting the value of said volt-second characteristics thereof to adjust the durations of said periods of conductivity of said transistors.

8. A direct-current to alternating-current inverter comprising an input circuit for energization with unidirectional power and an output transformer having an energizing winding and providing an alternating-current output circuit, a pair of rectangular-wave-form energizing sources, a pair of transistors having emitter and collector electrodes providing unidirectional coupling of said winding to said input circuit with a polarity of coupling by one of said transistors opposite to that of the other and having conductance-control base electrodes energized by individual ones of said sources for alternate conduction by said transistors, a resonant oscillatory circuit, and saturable-core reactor means connected in series with said oscillatory circuit between the base electrodes of said transistors for energization by both of said sources to control the alternate periods of conductivity of said transistors jointly according to the volt-second characteristic of said reactor means and the periodicity of said resonant circuit.

9. A direct-current to alternating-current inverter comprising an input circuit for energization with unidirectional power and an output transformer having an energizing winding and providing an alternating-current output circuit, a pair of rectangular-wave-form energizing sources, a pair of transistors having emitter and collector electrodes providing unidirectional coupling of said winding to said input circuit with a polarity of coupling by one of said transistors opposite to that of the other and having conductance-control base electrodes energized by individual ones of said sources for alternate conduction by said transistors, a resonant oscillatory circuit, a pair of saturable-core reactors, and a plurality of pairs of oppositely poled unidirectional conductive devices for directly coupling each of said reactors between the base electrodes of said transistors and for coupling each of said reactors in series with said resonant circuit between said base electrodes for bi-directional energization of said reactors and resonant circuit by both of said sources to control the alternate periods of conductivity of said transistors jointly according to the volt-second characteristic of said reactors and the periodicity of said resonant circuit.

10. A direct-current to alternating-current inverter comprising an input circuit for energization with unidirectional power and an output transformer having an energizing winding and providing an alternating-current output circuit, a pair of conductance control devices having conductance terminals providing unidirectional coupling of said winding to said input circuit with a polarity of coupling by one of said devices opposite to that of the other and each having forward-conductance control terminals, alternating current energizing sources providing resistive energizing circuits coupled to the conductance control terminals of individual ones of said devices to effect energizations thereof in opposed phase relationships and render said devices alternatively conductive, and a saturable core reactor having a winding electrically connected across said energizing circuits and energized by alternating magnetizing current supplied thereby synchronously with the alternating forward-conductance energizations of said conductance control terminals for terminating each conductance interval of said devices by reason of the effective electrical shorting of said energizing circuits alternately upon the core-saturation decrease of electrical impedance of said winding, whereby the periods of conductivity of said devices are terminated according to the volt-second saturation characteristic of said reactor.

11. A direct-current to alternating-current inverter comprising an input circuit for energization with unidirectional power and an output transformer having an energizing winding and providing an alternating-current output circuit, a pair of conductance control devices having conductance terminals providing unidirectional coupling of said winding to said input circuit with a polarity of coupling by one of said devices opposite to that of the other and each having forward-conductance control terminals, alternating current energizing sources providing resistive energizing circuits coupled to the conductance control terminals of individual ones of said devices to effect energizations thereof in opposed phase relationships and render said devices alternately conductive, and a saturable core reactor having a winding connected between conductance control terminals of said devices to receive alternately directed magnetizing-current energization from said energizing circuits and effect upon opposite polarities of magnetic saturation of the core thereof the periodic and alternate termination of the energization of the conductance control terminals of said devices by said energizing circuits and thereby control the periods of conductivity of said devices according to the volt-second saturation characteristic of said reactor.

12. A direct-current to alternating-current inverter comprising an input circuit for energization with unidirectional power and an output transformer having an energizing winding and providing an alternating current output circuit, a pair of conductance control devices having conductance terminals providing unidirectional coupling of said winding to said input circuit with a polarity of coupling by one of said devices opposite to that of the other and each having forward-conductance control terminals, energizing sources providing energizing circuits including series resistors therein to exhibit relatively poor energizing-circuit regulation characteristics and electrically coupled directly to the conductance control terminals of said devices to effect energizations thereof in opposed phase relationships and render said devices alternately conductive, and saturable-core reactor means electrically connected in a series circuit which includes said energizing circuits and said transformer energizing winding for increasing periodically and alternately by reactor-core saturation the loading of said energizing circuits periodically to alter the forward conductance energization of said conductance control terminals by said energizing circuits and thereby control the periods of conductivity of said devices according to the volt-second saturation characteristic of said reactor means.

References Cited by the Examiner

UNITED STATES PATENTS

| | | | |
|---|---|---|---|
| 2,809,303 | 10/57 | Collins | 307—88 |
| 2,849,673 | 8/58 | Hubbard | 321—16 X |
| 2,875,351 | 2/59 | Collins | 321—2 X |
| 3,081,437 | 3/63 | Radcliffe | 321—45 |
| 3,149,291 | 9/64 | Massey | 321—44 |

LLOYD McCOLLUM, *Primary Examiner.*

SAMUEL BERNSTEIN, *Examiner.*